US012691657B2

(12) United States Patent
Sahbaee et al.

(10) Patent No.: US 12,691,657 B2
(45) Date of Patent: Jul. 28, 2026

(54) FLAME-RESISTANT SHIELD FOR PROTECTED MEMBRANE ROOFS

(71) Applicants: DDP SPECIALTY ELECTRONIC MATERIALS US, LLC, Wilmington, DE (US); DUPONT SAFETY & CONSTRUCTION, INC., Wilmington, DE (US)

(72) Inventors: Arash Sahbaee, Richmond, VA (US); Greg Stewart, Midland, MI (US); Valentina Woodcraft, Midland, MI (US)

(73) Assignees: DDP SPECIALTY ELECTRONIC MATERIALS US, LLC, Wilmington, DE (US); DUPONT SAFETY & CONSTRUCTION, INC., Wilmington, DE (US)

( * ) Notice: Subject to any disclaimer, the term of this patent is extended or adjusted under 35 U.S.C. 154(b) by 283 days.

(21) Appl. No.: 18/341,829

(22) Filed: Jun. 27, 2023

(65) Prior Publication Data

US 2024/0017521 A1      Jan. 18, 2024

Related U.S. Application Data

(60) Provisional application No. 63/389,473, filed on Jul. 15, 2022.

(51) Int. Cl.
*B32B 5/00* (2006.01)
*B32B 5/02* (2006.01)
(Continued)

(52) U.S. Cl.
CPC ............... *B32B 5/022* (2013.01); *B32B 5/18* (2013.01); *B32B 5/245* (2013.01); *B32B 5/32* (2013.01);
(Continued)

(58) Field of Classification Search
CPC ........... B32B 5/022; B32B 5/18; B32B 5/245; B32B 5/32; B32B 2262/0269;
(Continued)

(56) References Cited

U.S. PATENT DOCUMENTS 2,910,763 A    11/1959   Lauterbach
3,063,966 A    11/1962   Kwolek et al.
(Continued)

FOREIGN PATENT DOCUMENTS

CN        109049898 A    12/2018
DE          2053630 A1     5/1972
(Continued)

OTHER PUBLICATIONS

PCT International Search Report for Application No. PCT/US2023/026214; Corentine Leroux, Authorized Officer; ISA/EPO; Oct. 3, 2023.
(Continued)

*Primary Examiner* — Chi Q Nguyen

(57) ABSTRACT

An inverted roof membrane assembly comprising:
  a) a waterproofing membrane suitable for direct or indirect mounting on top of a roof decking,
  b) at least one layer of the polymer foam insulation board directly or indirectly on top of a),
  c) a flame-resistant fabric shield directly or indirectly on top of b), said flame-resistant fabric shield having a water vapor permeability of 1.0 perm or greater; and
  d) a ballast layer directly or indirectly on top of c).

15 Claims, 1 Drawing Sheet

(51) Int. Cl.

| | |
|---|---|
| *B32B 5/18* | (2006.01) |
| *B32B 5/24* | (2006.01) |
| *B32B 5/32* | (2006.01) |
| *E04D 7/00* | (2006.01) |
| *E04D 11/00* | (2006.01) |

(52) U.S. Cl.

CPC ............ *E04D 7/005* (2013.01); *E04D 11/002* (2013.01); *B32B 2262/0269* (2013.01); *B32B 2262/144* (2021.05); *B32B 2262/16* (2021.05); *B32B 2266/0214* (2013.01); *B32B 2307/304* (2013.01); *B32B 2307/3065* (2013.01); *B32B 2307/54* (2013.01); *B32B 2307/5825* (2013.01); *B32B 2307/718* (2013.01); *B32B 2307/7246* (2013.01); *B32B 2307/7265* (2013.01); *B32B 2307/7376* (2023.05); *B32B 2419/06* (2013.01)

(58) Field of Classification Search

CPC .......... B32B 2262/144; B32B 2262/16; B32B 2266/0214; B32B 2307/304; B32B 2307/3065; B32B 2307/54; B32B 2307/5825; B32B 2307/718; B32B 2307/7246; B32B 2307/7265; B32B 2307/7376; B32B 2419/06; E04D 11/002; E04D 11/02; E04D 13/1662; E04D 7/005

See application file for complete search history.

(56) References Cited

U.S. PATENT DOCUMENTS

| | | | |
|---|---|---|---|
| 3,684,284 | A | 8/1972 | Tranfield et al. |
| 4,374,888 | A | 2/1983 | Bornslaeger |
| 4,556,601 | A | 12/1985 | Kirayoglu |
| 4,712,349 | A | 12/1987 | Riley et al. |
| 5,380,767 | A | 1/1995 | Suh et al. |
| 5,667,743 | A | 9/1997 | Tai et al. |

| | | | | |
|---|---|---|---|---|
| 7,771,636 | B2 | | 8/2010 | Headinger et al. |
| 7,771,637 | B2 | | 8/2010 | Headinger et al. |
| 7,771,638 | B2 | | 8/2010 | Headinger et al. |
| 7,780,889 | B2 | | 8/2010 | Headinger et al. |
| 7,998,575 | B2 | | 8/2011 | Headinger et al. |
| 8,324,287 | B2 | | 12/2012 | Hood et al. |
| 9,051,438 | B2 | | 6/2015 | Hood et al. |
| 10,441,909 | B2 | * | 10/2019 | Sahbaee ............... B01D 46/521 |
| 11,794,459 | B1 | * | 10/2023 | Drevet ................. B32B 29/005 |
| 12,098,557 | B2 | * | 9/2024 | Hunsaker ............... E04F 13/14 |
| 2006/0228962 | A1 | | 10/2006 | Souther et al. |
| 2007/0100010 | A1 | | 5/2007 | Creazzo et al. |
| 2008/0139682 | A1 | | 6/2008 | Vo et al. |
| 2008/0140892 | A1 | | 6/2008 | Fong et al. |
| 2012/0074347 | A1 | | 3/2012 | Gordon-Duffy |
| 2017/0037629 | A1 | * | 2/2017 | Srivastava .......... E04F 13/0883 |
| 2019/0194947 | A1 | * | 6/2019 | Brandt .................... B32B 27/12 |
| 2021/0340768 | A1 | * | 11/2021 | Ferreira Peralta ...... B32B 25/08 |
| 2022/0098866 | A1 | * | 3/2022 | Yang ..................... B32B 27/302 |
| 2023/0220244 | A1 | * | 7/2023 | Lem ........................ B32B 15/20 428/98 |
| 2023/0405979 | A1 | * | 12/2023 | Rofrano ................. E04C 2/296 |
| 2024/0240461 | A1 | * | 7/2024 | Finley ..................... E04D 7/005 |
| 2024/0262082 | A1 | * | 8/2024 | Geoffrion ............... B32B 5/022 |
| 2024/0392570 | A1 | * | 11/2024 | Nagarajan ............... E04D 11/02 |
| 2025/0129609 | A1 | * | 4/2025 | Yang ........................ E04D 5/10 |

FOREIGN PATENT DOCUMENTS

| | | | |
|---|---|---|---|
| DE | 9101312 | U1 | 4/1991 |
| EP | 2113617 | B1 | 12/2011 |
| WO | 00/69624 | A1 | 11/2000 |
| WO | 2017066990 | A1 | 4/2017 |

OTHER PUBLICATIONS

Woodcraft et al., "Thermally Insulating Extruded Foams Laminated with Barrier Films", Journal of Cellular Plastics, 2019, vol. 55 (1) 89-103.

* cited by examiner

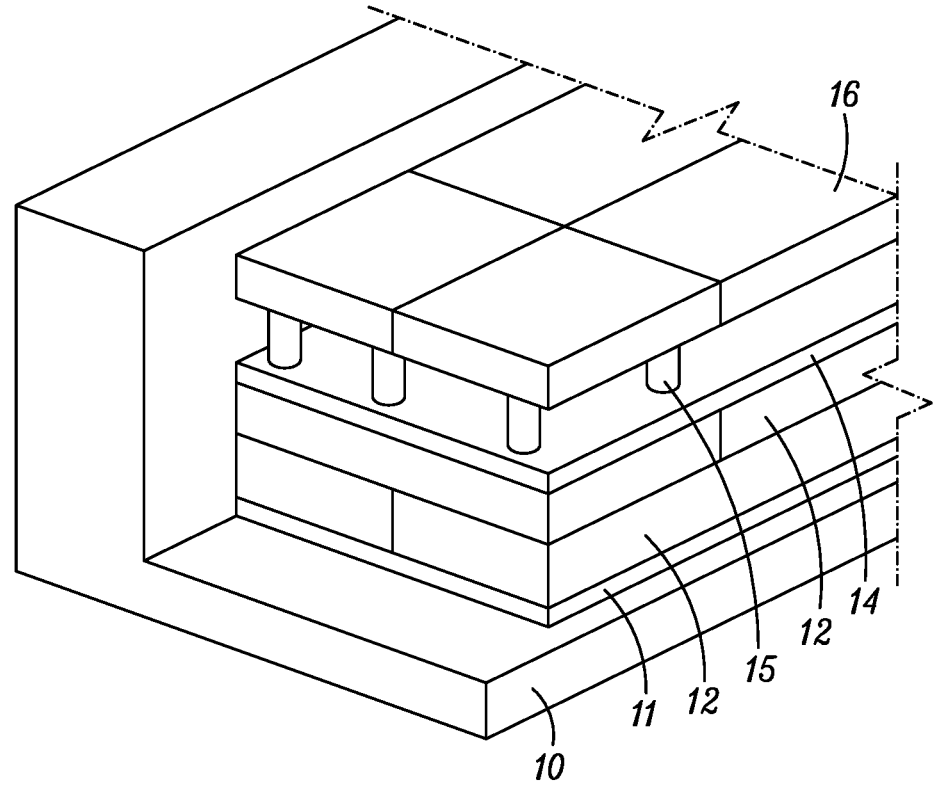

FLAME-RESISTANT SHIELD FOR PROTECTED MEMBRANE ROOFS

BACKGROUND OF THE INVENTION

Field of the Invention. The present invention relates to roof structures comprising foamed polystyrene boardstock, particularly inverted roof membrane assemblies (IRMAs), also known as "protected membrane roofs" (PMRs), which include a layer of foamed polystyrene boardstock as an insulation layer.

ASTM E108 is a fire-test-response standard that is used to evaluate roof coverings in both residential and commercial roofing applications for materials used on combustible or noncombustible decks. The evaluation simulates the fire originating outside the building accompanied by wind conditions.

In many applications, extruded polystyrene (XPS) foam is a good candidate for the insulation layer in an IRMA because of its combination of good mechanical properties, good insulation values, resistance to water penetration and low cost. XPS foam is manufactured as boardstock that is easily installed and fitted to specific roof geometries. IRMAs also normally include concrete pavers as the exterior roof surface. These concrete pavers successfully protect the XPS foam during ASTM E108 testing, regardless of size of the gap between XPS and the pavers, allowing the roof system as a whole to pass the test.

However, configurations of PMRs, where concrete pavers are installed on pedestals, raise concern of fire propagation within the cavity thus formed between the foam and the bottom of the pavers, should fire be introduced into the cavity and sustained therein. What is desired, therefore, is a flame shield that can be incorporated into an IRMA or PMR (used interchangeably herein) to further reduce the risk of sustained flame propagation within the cavity between foamed polystyrene insulation and the pavers.

BRIEF SUMMARY OF THE INVENTION

This invention relates to an inverted roof membrane assembly comprising:

a) a waterproofing membrane suitable for direct or indirect mounting on top of a roof decking, b) at least one layer of the polymer foam insulation board directly or indirectly on top of a), c) a flame-resistant fabric shield directly or indirectly on top of b), said flame-resistant fabric shield having a water vapor permeability of 1.0 perm or greater; and d) a ballast layer directly or indirectly on top of c).

This invention also relates to a flame-resistant fabric shield comprising a nonwoven felt of staple fibers, the nonwoven felt having a water vapor permeability of 1.0 perm or greater, a basis weight of about 150 to 800 grams per square meter, and a thickness of about 1.5 to 6.0 mm; wherein:

i) 20 to 100 weight percent of the total amount of staple fibers are re-purposed meta-aramid staple fibers; and ii) 0 to 80 weight percent of the total amount of staple fibers are crimped virgin meta-aramid staple fibers having a uniform cut length.

BRIEF DESCRIPTION OF THE DRAWINGS

FIG. 1 is a perspective view of an inverted roof membrane assembly on a roof.

DETAILED DESCRIPTION OF THE INVENTION

This invention relates to an inverted roof membrane assembly (IRMA) on a roof deck that comprises, in order, a waterproofing membrane, at least one layer of polymer foam insulation board, a flame-resistant fabric shield, and a ballast layer. A perspective view of an IRMA on a roof is shown in FIG. 1. The IRMA comprises a waterproofing membrane 11 directly mounted on the top of a roof decking 10. At least one layer of polymer foam insulation board 12 is directly on top of the waterproofing membrane 11. In FIG. 1, two layers of polymer foam insulation board 12 are shown. A flame-resistant fabric shield 14 is directly on top of the layer(s) of polymer foam insulation board 12. A ballast layer, such as a linear array of concrete pavers 16 are then on the flame-resistant fabric shield 14. In the embodiment shown in FIG. 1, the concrete pavers 16 are indirectly on the flame-resistant fabric shield 14 by use of a series of pedestals 15.

Herein, by use of the words "direct" or "directly", with regards to layers or items, it is meant a first layer or item is in contact with a second layer or item. By "directly mounted" it is meant a first layer or item is adjacent to and in contact with a second layer or item, the layers or items being preferably vertically adjacent, e.g., one layer or item resting on the other. Further, by the use of the words "indirect" or "indirectly" with regards to layers or items, it is meant that a first layer or item is not in contact with a second layer or item. By "indirectly mounted" it is meant a first layer or item is adjacent to but not in contact with a second layer or item, meaning that some additional intermediary layer(s) or item(s) prevent the first and second layers or items from being in contact; however, the first and second layers or items are still preferably vertically adjacent, e.g., the first layer or item is resting on one or more intermediary layer(s) or item(s), that is in turn resting on a second layer or item.

Waterproofing Membrane

A waterproofing membrane is installed on top of a roof decking, typically on a flat or low slope roof. The roof decking supports the overlying layers and items and can be of concrete, reinforced concrete, metal, wood, a composite, organic polymer or other building material that is capable of bearing the superimposed weight.

The waterproofing membrane suitable for such direct or indirect mounting on top of a roof decking can be an elastomeric or rubberized material that is durable, flexible, and suitable for preventing the ingress of water from the environment to the surface of the roof deck. In some embodiments, the waterproofing membrane is a rubberized asphalt membrane, one example of which is the liquid-applied Monolithic Membrane 6125® available from American Hydrotech, Inc., Chicago, IL. Preferably, the waterproofing membrane is a seamless membrane, meaning that no seams are present in the final waterproofing membrane to potentially leak with time. Multiple layers of the liquid coating can be applied to the roof, with a fibrous reinforcing membrane added between the coatings that becomes part of the waterproofing membrane. In some embodiments the thickness of the waterproofing membrane (with any fibrous reinforcing) preferably has a final thickness of 2 to 10 mm.

In some embodiments, waterproofing membrane is a thermoplastic or thermoset rubber such as thermoplastic olefin, ethylene-propylene-diene terpolymer or polyvinyl-chloride. Bitumen rubber membranes such as modified bitumen styrene-butadiene-styrene rubber membranes are useful as well. A bitumen rubber membrane may be reinforced with glass and/or polymeric fibers.

Specifically, to protect the waterproofing membrane from damage during roof installation, particularly from foot traffic, an optional additional protection layer that is a fiber-reinforced elastomeric sheet can be installed on top of the waterproofing membrane, between the waterproofing membrane and the at least one layer of the polymer foam insulation board. Typically, the protection layer is embedded into the waterproofing membrane while the waterproofing membrane is installed to obtain good adhesion of the protection layer to the waterproofing membrane. One example of a protection layer is Hydroflex 30® available from American Hydrotech, Inc., Chicago, IL. For the purposes herein, if a protection layer is used, it is considered part of the waterproofing membrane. In some embodiments the protection layer has a nominal thickness of 1 to 3 mm and can increase the thickness of the total waterproofing membrane to 3 to 13 mm.

While the insulation may be installed directly on the waterproofing membrane, alternatively, one or more optional layers may be installed between the waterproofing membrane and insulation. Examples of such optional layers may include, for example, a drainage or another sheet-good layer. Similarly, one or more optional layers as just described may be installed between waterproofing membrane and layer(s) of the polymer foam insulation board, if desired.

Polymer Foam Insulation Board

At least one layer of the polymer foam insulation board is installed directly or indirectly on top of the waterproofing membrane layer. Polymer foam insulation board is typically in the form of rectangular or square boardstock having lengths (longest dimension) of 0.61 meters (24 inches) to 3.66 meters (12 feet), especially 1.83 to 3.66 meters (6 to 12 feet) and widths (orthogonal to the length along a major surface) of 0.305 meters (12 inches) to 3.66 meters (12 feet), especially 0.46 meters (18 inches) to 2.44 meters (8 feet) or 0.61 meters (2 feet) to 1.83 meters (6 feet). The polymer foam insulation board may be rabbeted along one or more edges (preferably all four edges) to facilitate mating with adjacent sections of polymer foam insulation board during installation. In some embodiments, at least one layer of polymer foam insulation board comprises at least two layers of the polymer foam insulation board, which are directly or indirectly on top of the waterproofing membrane layer.

The polymer foam insulation board can additionally comprise a top and bottom facer. "Top" and "bottom" as used with regard to the facers, refer to orientation of polymer foam insulation board when installed, such as in an inverted roof membrane assembly installation. The "top" facer is that which faces outward when installed, i.e., toward the exterior of the construction, and forms a top surface of the polymer foam insulation board. When installed in a roof structure, bottom facer is on the side of polymer foam insulation board that faces the waterproofing membrane and roof decking, whereas top facer is on the opposite side of polymer foam insulation board, facing toward the ballast and exposed roof surface and forming a top surface of the polymer foam insulation board. In one embodiment, the top and bottom facer form a substantial barrier to water vapor diffusion (less than 1 perm, or even less than 0.5 perm, or less still than 0.1 perm).

The polymer foam insulation board comprises one or more organic polymers, including one or more alkenyl-aromatic polymers. By "alkenyl-aromatic polymer", it is meant a homopolymer of alkenyl-aromatic monomer, a copolymer of two or more alkenyl-aromatic monomers, or a polymer (such as a random, block and/or graft copolymer) of at least 50%, preferably at least 70% or at least 75%, by weight of one or more alkenyl-aromatic monomers, and up to 50% by weight, preferably up to 30% or up to 25%, of one or more other monomers that is not an alkenyl-aromatic monomer. Alkenyl-aromatic monomers include, for example, styrene, alpha-methyl styrene, ethyl styrene, vinyl toluene, chlorostyrene and bromostyrene. Examples of other monomers include, for example, acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene.

The alkenyl aromatic polymer is thermoplastic and may be linear or branched. The alkenyl aromatic polymer can have a weight average molecular weight, as measured by gel permeation chromatography against linear polystyrene standards, of at least 40,000 g/mol, at least 60,000 g/mol or at least 75,000 g/mol. It may have a weight average molecular weight of, for example, up to 500,000 g/mol, up to 300.00 g/mol, up to 250,000 g/mol or up to 150,000 g/mol. The alkenyl aromatic polymer can have a polydispersity (weight average molecular weight÷number average molecular weight) of 1 to 3 or greater, preferably 1 to 2.5. In some embodiments, water is soluble in the alkenyl aromatic polymer, at 130° C. and 101 kPa pressure, to the extent of 0.09 to 2.2 moles of water per kg of alkenyl aromatic polymer (mol/kg), preferably 0.15 to 2.2 mole/kg.

Alkenyl aromatic polymers of particular interest are styrene homopolymer and random and/or block copolymers of styrene and acrylonitrile. An especially preferred alkenyl aromatic polymer is a random and/or block copolymer of that contains 0.1 to 30% by weight polymerized acrylonitrile, 70% to 99.9% by weight polymerized styrene, and 0 to 2% by weight of one or more other monomers (such as other alkenyl aromatic monomers. Such a styrene-acrylonitrile copolymer may contain, for example, at least 5% or at least 10% by weight polymerized acrylonitrile and may contain up to 25%, up to 22.5% or up to 20% by weight polymerized acrylonitrile. Such a styrene-acrylonitrile copolymer may exhibit a positive "skew", and/or a positive percent difference between the mean and median copolymerized acrylonitrile distribution, each as defined in U.S. Pat. No. 8,324, 287 and may alternatively or in addition have a mean copolymerized acrylonitrile content of 20 weight-% or less.

The alkenyl aromatic polymer(s) preferably contain no more than 20 weight-percent halogen, more preferably no more than 10 weight-percent halogen or no more than 5 weight percent halogen. They may contain any smaller amount of halogen and may be devoid of halogen.

More than one alkenyl aromatic polymer may be present. In addition, the organic polymers may include one or more other organic polymers, which are not alkenyl aromatic polymers. Such other organic polymers, if present at all, preferably constitute no greater than 15 percent of the total weight of all the organic polymers, and more preferably no more than 5 weight percent thereof. The other organic polymer may be more hydrophilic than the alkenyl aromatic polymer(s). For example, water may be soluble in the other organic polymer in an amount greater than 2.2 moles/kg at 130° C. and 101 kPa pressure). Examples of such other organic polymers include copolymers of ethylene with one or more of acrylic acid, methacrylic acid, a C1-4 polycarboxylic acid and/or an acrylate monomer; polyvinyl acetate; and polyacrylonitrile.

The foam in the polymer foam insulation board includes at least 0.25 weight percent, at least 0.5 weight percent or at least 1.0 weight percent, based on the weight of the foam, of one or more infrared attenuating additives, i.e., an additive that inhibits the transmission of infrared radiation through the polymer foam. The foam in the polymer foam insulation board may contain, for example, up to 5 weight percent, up to 3 weight percent or up to 2 weight percent of the infrared attenuating additive(s). Among the useful infrared absorbing additives are various forms of carbon (including, for example, one or more of graphite; carbon black; soot; carbonized fibers, flakes or powders; carbon nanotubes and fullerenes, powdered amorphous carbon and the like), metal flakes, metal and semi-metal oxides such as titanium dioxide, silicon dioxide, manganese (IV) oxide, magnesium oxide, bismuth (III) oxide, cobalt oxide, zirconium (IV) oxide, molybdenum (II) oxide, calcium oxide and alumina boehmite. A preferred polymer layer includes 0.25 to 5, preferably 0.25 to 3, weight percent of one or more forms of carbon, especially graphite, carbon black or a mixture thereof.

The foam in the polymer foam insulation board includes gas-containing cells. The gas in the cells in some embodiments includes at least one fluorocarbon having 1 to 4 carbon atoms. The fluorocarbon in some embodiments does not contain chlorine. Examples of such fluorocarbons include methyl fluoride, perfluoromethane, ethyl fluoride, 1,1-difluoroethane (HFC-152a), 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, perfluorobutane, perfluorocyclobutane, trifluoropropene, 1,3,3,3-tetrafluoropropene (1234ze), 1,1,3,3-tetrafluoropropene, 2,2,3,3-tetrafluoropropene (1234yf), 1,2,3,3,3-pentafluoropropene (1225ye), 1,1,1-trifluoropropene, 1,1,1,3,3-pentafluoropropene (1225zc), 1,1,2,3,3-pentafluoropropene (1225yc), (Z)-1,1,1,2,3-pentafluoropropene (1225yez), 1-chloro-3,3,3-trifluoropropene (1233zd) and 1,1,1,4,4,4-hexafluorobut-2-ene (1336mzzm), as well as other hydrofluoroolefin (HFO) and/or hydrofluorochloroolefin (HFCO) blowing agents (component d)) include those described, for example, in US 2007/0100010. The gas in the cells in some embodiments includes carbon dioxide; water; and/or one or more C1-9 hydrocarbons. In a preferred embodiment, the gas in the cells includes at least one fluorocarbon, carbon dioxide, water, and optionally also at least one hydrocarbon.

The foam in the polymer foam insulation board has a density of at most 56 kg/m³ (3.5 pounds per cubic foot (pcf)). The foam density may be at least 21 kg/m³ (1.3 pcf), at least 28 kg/m³ (1.75 pcf) or at least 32 kg/m³ (2 pcf), and may be in some embodiments up to (56 kg/m³) (3.5 pcf) or up to 40 kg/m³ (2.5 pcf). The foam in the polymer foam insulation board may contain other materials that perform useful functions. Examples of such other materials include, for example, pigments (other than the infrared attenuating additive(s)), fillers, antioxidants, extrusion aids, cell nucleation agents (other than the infrared attenuating additives(s)), antistatic agents, flame and/or smoke retardants, acid scavengers, and the like.

The polymer foam insulation board preferably has a thickness of at least 0.6 cm (0.25 inches). The thickness may be any larger value, such as up to 45.7 cm (18 inches), up to 30.5 cm (12 inches, up to 20.3 cm (8 inches) or up to 15.24 cm (6 inches). An especially preferred thickness is at least 7.62 cm (3 inches) or at least 10.16 cm (4 inches) and up to 20.3 cm (8 inches) or up to 15.24 cm (6 inches).

The polymer foam insulation board preferably has an RSI-value of at least 0.53 K·m²/W per 25.4 mm of thickness, as measured according to ASTM C518-17 at a 24° C. mean temperature. The RSI value may be at least 1.0, at least 1.05, at least 1.1, at least 1.25 or at least 1.4 K·m²/W per 25.4 mm of thickness. The RSI value in some embodiments is up to 2, up to 1.75, up to 1.6 or up to 1.5 K·m²/W per 25.4 mm of thickness.

In some embodiments, the polymer foam insulation board used in the inverted roof membrane assembly has a foam density of at most 56 kg/m³ (3.5 pounds per cubic foot), a thickness of at least 0.6 cm (0.25 inches), an RSI-value of at least 0.53 K·m²/W per 25.4 mm of thickness (R-value of 13.01 F°·ft²·h/BTU/inch of thickness). In some embodiments, the polymer foam insulation board has a foam density of 21 to 56 kg/m³ and a thickness of 7.62 to 15.24 cm.

The polymer foam insulation board preferably is an extruded foam made by forming a pressurized mixture of heat-softened alkenyl aromatic polymer(s), one or more blowing agents, the infrared absorbing additive(s) and other optional ingredients (if any) and then exposing the pressurized mixture to a lower pressure and temperature such that the mixture expands and cools to form a cellular foam. Such extrusion processes are well known and described, for example, in U.S. Pat. Nos. 5,380,767, 8,324,287 and 9,051, 438, among many other references. Extrusion processes are conveniently performed using a single- or twin-screw extruder to form the pressurized mixture, which exits the extruder through a die, typically a dog bone-shaped die, after which the mixture expands and cools. Accumulating extrusion processes such as described in US Published Patent Application No. 2008-0139682A are also useful.

The gas within the cells of the resulting polymer foam in the polymer foam insulation board corresponds, at least initially, to the blowing agent used to make the foam. Thus, the blowing agent may include, for example one or more of a fluorocarbon having 1 to 4 carbon atoms as described above; carbon dioxide; water; and a C1-9 hydrocarbon. In some embodiments, the blowing agent is a mixture of that includes a fluorocarbon having 1 to 4 carbon atoms; carbon dioxide and water; in such a mixture, the fluorocarbon can be provided, for example, in an amount of 0.4-2, especially 0.5 to 1.2, mol/kg of alkenyl aromatic polymer(s) (mol/kg); carbon dioxide can be provided, for example, in an amount of 0.1 to 0.5, especially 0.2 to 0.4 mol/kg; and water can be provided, for example, in an amount of 0.15 to 2, especially 0.25 to 1.5 mol/kg, with the total amount of blowing agent being 0.65 to 2.5 mol/kg. Such blowing agent mixtures are described, for example, in US 2008/140892.

The at least one layer of polymer foam insulation board can be installed in the same manner as conventional foam insulation board, by laying individual sections of boardstock adjacent to each other to cover waterproofing membrane and form an insulation and protective structure above waterproofing membrane. When rabbeted, individual sections of boardstock can be mated to form rabbet joints between adjacent sections of boardstock. Adjacent sections of boardstock can be ship-lapped or even interlocking through corresponding mating rabbets on each of the adjacent boardstock sections. When ship-lapped, channels form between the top surfaces of adjacent sections of boardstock; these can function to channel water toward a drain or an edge of the roof.

The at least one polymer foam insulation board layer may or may not be secured to underlying structure. Optionally it may be secured through use of an adhesive or by any suitable mechanical fastening method. Alternatively, or in addition, the at least one polymer foam insulation board layer is at least partially loose-laid and at least partially held in place by the layers or items installed on top of the layer(s).

Flame-Resistant Fabric Shield

In some embodiments, this invention relates to an inverted roof member assembly comprising a flame-resistant fabric shield is installed directly or indirectly on top of the at least one polymer foam insulation board layer; the flame-resistant fabric shield has a water vapor permeability of 1.0 perm or greater.

In some other embodiments, this invention also relates to a flame-resistant fabric shield comprising a nonwoven felt of staple fibers. The nonwoven felt has a water vapor permeability of 1.0 perm or greater, and in some embodiments has a basis weight of about 150 to 800 grams per square meter, and a thickness of about 1.5 to 6.0 mm; in some embodiments the nonwoven felt comprises:

i) 20 to 100 weight percent of the total amount of staple fibers are re-purposed meta-aramid staple fibers; and ii) 0 to 80 weight percent of the total amount of staple fibers are crimped virgin meta-aramid staple fibers having a uniform cut length.

In some embodiments, the nonwoven felt has a basis weight of about 150 to 400 grams per square meter, and a thickness of about 1.5 to 4.0 mm.

It should be understood that any and all of the features, options, and elements described herein for the flame-resistant fabric shield equally apply to the flame-resistant fabric shield as used in the inverted roof member assembly and the flame-resistant fabric shield article itself.

In some specific embodiments, this invention relates to an inverted roof member assembly comprising a flame-resistant fabric shield comprising a felt of staple fibers, the felt having a water vapor permeability of 1.0 perm or greater, a basis weight of about 150 to 800 grams per square meter, and a thickness of about 1.5 to 6.0 mm; and i) 20 to 100 weight percent of the total amount of staple fibers are re-purposed meta-aramid staple fibers; and ii) 0 to 80 weight percent of the total amount of staple fibers are crimped virgin meta-aramid staple fibers having a uniform cut length.

In some embodiments, the felt of the flame-resistant fabric shield has a basis weight of about 150 to 400 grams per square meter, and a thickness of about 1.5 to 4.0 mm.

In some further embodiments, the flame-resistant fabric shield comprises:

i) 40 to 80 weight percent of the total amount of staple fibers are re-purposed meta-aramid staple fibers; and ii) 20 to 60 weight percent of the total amount of staple fibers are crimped virgin meta-aramid staple fibers having a uniform cut length.

In some embodiments, at least 40 weight percent of the total amount of the staple fibers of the flame-resistant fabric shield are long staple crimped staple fibers.

It is believed the flame-resistant fabric shield should have a water vapor permeability of 1 perm or greater to ensure the structure does not trap water after exposure to rain, but instead allows the structure to dry out. In some embodiments, the flame-resistant fabric shield has a water vapor permeability of 10 perms or less; higher values are believed to provide excessive fabric openness that may not function as a flame-resistant fabric shield.

In some embodiments the flame-resistant fabric shield is a nonwoven felt. By nonwoven felt, what is meant is the conventional felt structure achieved by consolidating a batt of staple fibers, typically via either needle punching or hydrolacing. Needle punching processes such as disclosed in U.S. Pat. Nos. 2,910,763 and 3,684,284, and hydrolacing or spunlacing processes such as disclosed in U.S. Pat. No. 4,556,601 to Kirayoglu describe processes known in the art for the manufacture of the nonwoven felts. Preferably, the nonwoven felt is a needle-punched felt.

The term "staple fibers" as used herein refer to fibers made by cutting filaments into lengths of no more than about 15 cm (5.9 inches), preferably 3 to 15 cm (1.2 to 5.9 inches); and most preferably 3 to 8 cm (1.2 to 3.1 inches). The staple fiber can be straight (i.e., non-crimped) or crimped to have a saw tooth shaped crimp along its length, with any crimp (or repeating bend) frequency.

As used herein, the term "re-purposed" meta-aramid staple fibers mean meta-aramid staple fibers that are derived from filament feedstock or other fibrous sources that is normally considered and treated as waste; these "re-purposed" meta-aramid staple fibers can have as their source at least one of the following categories that generate meta-aramid filament and meta-aramid fibrous waste:

i) spinning machine filament waste, which are filaments that have been spun but are never packaged for first-grade sale and that were considered and treated as waste; these filaments include the filament waste created during spinning machine startup and shutdown, and general spinning machine waste that occurs during spinning machine upsets;

ii) filaments that have been spun and wound into packages but that have defects and are considered and treated as waste; these filaments include filaments having unacceptable uniformity, such as denier or color variations; filaments having mechanical or structural defects, and filaments having unacceptable amounts of spin finish or lacking spin finish, making them generally unsuitable for subsequent normal processing;

iii) bobbin tails, which are the filaments remaining on a bobbin after a specific length of yarn has been used from a bobbin, and which are not of sufficient length that they must be disposed of as waste;

iv) fibrous material generated from the deconstructing of woven or knit fabrics in a fabric recycling process; and v) fibrous material recovered from recycled objects and other recycled materials.

Depending on the source, the "re-purposed" meta-aramid staple fibers may or may not have crimp and may or may not be precisely cut. For example, filaments that have been spun and wound into packages but that have defects and are considered and treated as waste, and bobbin tails, may be of sufficient quality that they can be crimped and precisely cut.

In some embodiments, the nonwoven felt that is the flame-resistant fabric shield consists essentially of the meta-aramid staple fibers as described herein. As used herein, the use of "consists essentially of" in regard to a blend of fibers is intended to mean the blend of fibers could additionally obtain up to about 5 percent of additional material or fibers that do not appreciably affect the performance of the non-woven felt.

Useful meta-aramid containing fiber, including poly (metaphenylene isophthalamide) (MPD-1) containing fiber, has a Limiting Oxygen Index (LOI) of about 26 or higher. This means the meta-aramid staple fibers preferably provide the nonwoven felt with fibers that do not burn in air. The limiting oxygen index (LOI) is the minimum concentration of oxygen, expressed as a percentage, that will support combustion of a polymer. It is measured by passing a mixture of oxygen and nitrogen over a burning specimen and reducing the oxygen level until a critical level is reached. LOI values for different plastics are determined by standardized tests, such as the ISO 4589 and ASTM D2863. Air is nominally about 21 percent oxygen, so materials with LOI values less than 21 are classified as combustible, but those with LOI greater than 21 are classed as self-extinguishing since their combustion cannot be sustained at ambient temperature without an external energy contribution. If a blend of meta-aramid staple fiber and other fibers are present in the felt, then it is believed the other fibers should also preferably have an LOI of at least 24. In some embodiments, the felt further comprises up to 80 weight percent staple fiber having a limiting oxygen index (LOI) of 24 or higher, based on the total amount of staple fibers present in the felt. Specifically, the other staple fibers can be crimped staple fibers, particularly crimped virgin staple fibers made from a material having an LOI of 24 or higher. Preferably, all of the fibers or fibrous material in the nonwoven felt or flame-resistant fabric shield have an LOI of 24 or higher.

The use of re-purposed meta-aramid staple fibers in the nonwoven felt of the flame-resistant fabric shield provides several benefits. For example, the use of these fibers avoids disposing these fibers as waste, which lessens the number of fibers sent to landfills, which is beneficial to the environment. An additional benefit is that the use of these fibers helps reduce the overall cost of the felt. Another benefit is that the requirements for the flame-resistant fabric shield application are suited for the use of such re-purposed meta-aramid staple fibers. 20 to 100 weight percent of the total amount of meta-aramid staple fibers in the nonwoven felt are re-purposed meta-aramid staple fibers as defined herein. In some embodiments, 25 to 100 weight percent of the total amount of meta-aramid staple fibers in the nonwoven felt are re-purposed meta-aramid staple fibers. In some other embodiments, at least 30 weight percent of the total amount of meta-aramid staple fibers in the nonwoven felt are re-purposed meta-aramid staple fibers. In some other embodiments, the total amount of meta-aramid staple fibers in the nonwoven felt that are re-purposed meta-aramid staple fibers is 70 weight percent or less.

In some embodiments, at least some percentage of the re-purposed meta-aramid staple fibers have a variable cut length. Due to the wide variety of waste filament sources, all of the filament feedstock used for the re-purposed meta-aramid staple fibers may not be able to be crimped and cut via normal staple cutting processes. For example, filaments that have been spun and wound into packages but that have defects and bobbin tails can generally be cut into staple using conventional crimping/cutting processes, provided meta-aramid filaments that are crimped with a uniform cut length. However, spinning machine filament waste and fibers generated from the deconstructing of fabrics are generally collected as a mass of filaments, making them unsuitable for conventional crimping/cutting processes. These filaments can instead be cut into staple using a guillotine or other type of chopping operation; however, the staple is not crimped, and the cut length is not tightly controlled, providing a meta-aramid staple with a variable cut length. In some embodiments, at least 20 weight percent of the re-purposed meta-aramid staple fibers have a variable cut length; in some embodiments amount of the re-purposed meta-aramid staple fibers having a variable cut length is 60 weight percent or less.

Therefore, the re-purposed meta-aramid staple fibers can include variable cut length re-purposed meta-aramid staple fibers and precise cut-length re-purposed meta-aramid staple fibers. In some embodiments, the variable cut length re-purposed meta-aramid staple fibers do not have crimp and the precise cut-length re-purposed meta-aramid staple fibers do have crimp.

While it is advantageous to use re-purposed meta-aramid staple fibers in the nonwoven felt, there may be instances wherein it may be desirable to additionally use meta-aramid staple fibers that are not re-purposed meta-aramid staple fibers in the nonwoven felt for improved uniformity. That is, since re-purposed meta-aramid staple fibers are generated from filament feedstock that is normally considered and treated as waste, the variability of the re-purposed meta-aramid staple fibers will be higher than meta-aramid staple fibers made from commercially salable meta-aramid filaments.

Therefore, 0 to 80 weight percent of the total amount of meta-aramid staple fibers in the nonwoven felt are crimped virgin meta-aramid staple fibers having a uniform cut length. In some embodiments, 0 to 75 weight percent of the total amount of meta-aramid staple fibers in the nonwoven felt are crimped virgin meta-aramid staple fibers having a uniform cut length.

As used herein, the use of term "virgin" in regard to fibers, including staple fibers, it is meant the fibers are unused; that is, they have not been previously used in some application or textile or other article, and further such fibers are not considered re-purposed fibers as described herein. These virgin fibers generally have some predictable uniformity of structure and suitable quality such that they could be used or sold as fibers for applications that require or desire unused fibers; such applications would then provide the first use of these virgin fibers in textile yarns, fabrics, and other structures.

Additionally, as used herein, the phrase "crimped virgin meta-aramid staple fibers having a uniform cut length" means meta-aramid staple fibers specifically made, crimped, cut, and commercially sold in bales to be used as meta-aramid staple fibers in traditional textile applications (yarns, fabrics, and nonwovens, etc.) and are not re-purposed meta-aramid staple fibers. In some embodiments, the meta-aramid staple fibers in the felt consists of re-purposed meta-aramid staple fibers and crimped virgin meta-aramid staple fibers.

If it is desirable for both the re-purposed meta-aramid staple fibers, and the crimped virgin meta-aramid staple fibers having a uniform cut length, to both be present in the nonwoven felt, preferably the nonwoven felt is made from a feedstock that is an intimate staple fiber blend of both types of fibers, meaning that both types of fibers are uniformly mixed together. Further, if both the re-purposed meta-aramid staple fibers, and the crimped virgin meta-aramid staple fibers having a uniform cut length, are present in nonwoven felt, preferably they also disposed in the nonwoven felt as an intimate blend, meaning that the two types of fibers are uniformly mixed and distributed in the felt. The uniform mixture in the felt avoids any localized areas having a high concentration of any one type of fiber in any one portion of the felt.

Additionally, in some embodiments, at least 40 weight percent of the total amount of the combined staple fibers in the nonwoven felt are crimped staple fibers. It is believed that a supply of staple fibers having less than 50 weight percent crimped staple fiber will have more issues in carding and other processing issues, making the generation of nonwoven felts more difficult. In some embodiments, at least 60 weight percent of the total amount of the combined staple fibers in the nonwoven felt are crimped staple fibers. In some other embodiments, the total amount of the combined staple fibers in the nonwoven felt that are crimped staple fibers is 75 weight percent or less.

In some preferred embodiments, the staple fibers that have crimp have a crimp frequency of 2.5 to 5.5 crimps per centimeter (7 to 14 crimps per inch); and in some embodiments both the uniform and variable cut length staple fibers have crimp. In some preferred embodiments in the nonwoven felt, the staple fibers, including both uniform and variable cut length, have a cut length that is minimally 1.0 centimeters (0.4 inches). In some preferred embodiments in the nonwoven felt, both the staple fibers, including both uniform and variable cut length, have a cut length that is maximally 10.1 centimeters (4.0 inches). As used herein, "uniform cut length" and "precise cut length" are intended to have the same meaning and be interchangeable. The staple fibers that have a uniform cut length are preferably cut to a length of 3.8 to 10.1 centimeters (1.5 to 4.0 inches). In still some other embodiments, the nonwoven felt consists of 60 to 40 weight percent of meta-aramid staple fibers having a uniform or precise cut length and 40 to 60 weight percent of meta-aramid staple fibers having a variable cut length, based on the total amount of the combined meta-aramid staple fibers in the nonwoven felt.

Additionally, in some embodiments, at least 20 weight percent of the crimped fibers are "long staple" fibers. As used herein, by "long staple" it is meant a crimped staple fiber having a cut length of 2.5 to 10.1 centimeters (1 to 4 inches). In some embodiments, at least 40 weight percent of the total amount of the staple fibers of the flame-resistant fabric shield is long staple crimped staple fibers. If desired, other fibers such as glass, polyacrylonitrile, mineral wool, or mixtures thereof can be combined with the re-purposed meta-aramid staple fibers.

The nonwoven felt has a basis weight of 150 to 800 grams per square meter and in some embodiments the nonwoven felt has a basis weight of at least 200 grams per square meter. In some embodiments, the nonwoven felt has a basis weight of 150 to 400 grams per square meter, preferably a basis weight of 200 to 400 grams per square meter. The nonwoven felt additionally has a thickness of 1.5 to 6.0 mm; and in some embodiments the nonwoven felt has a thickness has a thickness of 1.5 to 4.0 mm. These basis weights and thicknesses of the nonwoven felt can provide a single-layer flame-resistant fabric shield, meaning that a single layer of the nonwoven felt can function as desired in the IRMA. However, if desired, the flame-resistant fabric shield can comprise multiple layers of the nonwoven felt as described herein. Alternatively, the flame-resistant fabric shield can include one or more layers of the nonwoven felt described herein layered with one or more layers of one or more felts that do not have re-purposed meta-aramid staple fibers, as long as the flame performance of the IRMA is not reduced by the addition of the other nonwoven felts.

In some embodiments, meta-aramid staple fiber refers to staple fiber made from filaments of an aramid polymer wherein the two rings or radicals are meta oriented with respect to each other along the molecular chain. Poly (m-phenylene isophthalamide) (MPD-1) is the preferred meta-aramid polymer and preferred meta-aramid staple fiber. By MPD-I is meant the homopolymer resulting from mole-for-mole polymerization of m-phenylene diamine and isophthaloyl chloride and, also, copolymers resulting from incorporation of small amounts of other diamines with the m-phenylene diamine and of small amounts of other diacid chlorides with the isophthaloyl chloride. As a general rule, other diamines and other diacid chlorides can be used in amounts up to as much as about 10 mole percent of the m-phenylene diamine or the isophthaloyl chloride, or perhaps slightly higher, provided only that the other diamines and diacid chlorides have no reactive groups which interfere with the polymerization reaction. Additives can be used the making of the meta-aramid fibers as long as the nonwoven felt made from such fibers performs adequately as a flame-resistant fabric shield.

Meta-aramid filaments are generally spun by extrusion of a solution of the meta-aramid polymer through capillaries and removing the solvent via dry or wet-spinning processes as is known in the art. In the case of poly (m-phenylene isophthalamide), the solvent for the solution is generally dimethyl acetamide. The solvent-containing dope filaments are spun, followed by removal of solvent and other treatments such as washing, drying, and optionally heat treating as is known in the art. Some useful processes for making meta-aramid fibers are disclosed in, for example, U.S. Pat. Nos. 3,063,966 and 5,667,743. Additional useful methods for making meta-aramid fibers like MPD-1-containing fibers include U.S. Pat. Nos. 7,771,636; 7,771,637; 7,771,638; 7,780,889; & 7,998,575. Some of these patents disclose dry spinning of meta-aramid filaments using a spinning cell having a heated gaseous atmosphere, wherein heated gas is provided to the spin cell to remove solvent. The meta-aramid filaments can then be cut and crimped using conventional techniques to make meta-aramid staple fibers.

Ballast

A ballast layer is installed directly or indirectly on top of the flame-resistant fabric shield. The ballast material is a dense, heavy material that by force of gravity holds the items in the roof assembly in place, particularly the flame-resistant fabric shield and the layer(s) of polymer foam insulation board. Ballast materials may include a coarse or fine particulate material such as gravel, stone, soil, or growing media. The ballast may be or include a planting medium for a green roof or other green roof structure or component of a green roof structure. The ballast may be or include a blue roof structure or a component thereof. Other ballast materials include pavers of various shapes and sizes, which may form a continuous or discontinuous layer. Different ballast materials may be used in any particular roof structure. In some embodiments, the ballast of the inverted roof membrane assembly of comprises gravel, stone, soil, concrete pavers, a green roof structure or component thereof, or a blue roof structure or component thereof.

If desired, the ballast layer can be indirectly mounted on the flame-resistant fabric shield by use of other items or layers positioned between the flame-resistant fabric shield and the ballast layer. One particularly useful arrangement is the use of a series of pedestals inserted and distributed between the flame-resistant fabric shield and the ballast layer to provide pillars for supporting the ballast layer as shown in FIG. 1. These pedestals provide for improved air circulation on the roof, helping to reduce heat conduction from the ballast to the roof deck. Pedestals can be made of any material that can suitably support the desired ballast material; they are typically made from plastic or metal or combinations thereof, but other materials of construction are possible, if needed. Any suitable arrangement of pedestals could be used as long as the roof performs as desired.

Test Methods

Flame performance. The performance of the flame-resistant fabric shield in the roofing application was measured using ASTM E108. ASTM E108 is a fire-test-response standard that is used to evaluate roof coverings in both residential and commercial roofing applications for materials used on combustible or noncombustible decks. The evaluation simulates the fire originating outside the building accompanied by wind conditions.

Water Vapor Permeability/Permeance. The water vapor permeability (in US Perm-inch) and the water vapor permeance (in US Perm) of the flame-resistant fabric shield is measured using ASTM E96.

Trapezoid Tear Strength. The trapezoid tear strength (in pounds per square inch) of the flame-resistant fabric shield is measured using ASTM D4533.

Tensile Strength/Strain. The tensile strength (in pounds per square inch) and strain (in percent) of the flame-resistant fabric shield is measured using ASTM D882.

Example 1

A number of nonwoven fabric samples in the form of a needle-punched felt were made from re-purposed meta-aramid staple fiber, specifically poly(metaphenylene isophthalamide) staple fiber, having a cut length varying from 0.4 to 2.5 inches, and precise-cut crimped virgin meta-aramid staple fibers, specifically poly(metaphenylene isophthalamide) staple fiber, having a uniform cut length of 3 inches. Both meta-aramid staple fibers had a linear density of about 2.2 denier. The fiber compositions used to make the fiber supply for each of the fabric samples are shown in Table 1.

Each of the fiber supplies was carded to form a web, which was then crosslapped to form a batt that was then needled-punched; the batt was first consolidated by needle-punching with a needle density of 75 penetrations per square centimeter and then needle-punched two additional times, each of which had a needle density of 125 penetrations per square centimeter. The final felt thicknesses and basis weights are shown in Table 1.

TABLE 1

| Nonwoven Fabric | Re-Purposed Meta-Aramid Fiber % | Precise-Cut Meta-Aramid Fiber % | Fabric Thickness, mm | Fabric Basis Weight, g/m² |
|---|---|---|---|---|
| 1 | 100 | 0 | 2.5 | 250 |
| 2 | 80 | 20 | 3.0 | 270 |
| 3 | 70 | 30 | 3.0 | 275 |
| 4 | 60 | 40 | 3.0 | 300 |
| 5 | 60 | 40 | 3.0 | 275 |

Example 2

Nonwoven fabric Items 3 & 5 of Table 1 were then evaluated for their flame spread performance, using ASTM E108-20a (r2020), "Standard Test Methods for Fire Tests of Roof Coverings". The test plan was per section 7.1 of ASTM E108, for roof coverings restricted for use on noncombustible decks (steel, concrete, or gypsum). The Spread of Flame tests were the only required tests. The inventive fabric items were compared to the performance of two samples of Atlas® FR-10 (Items A & B), which is a known barrier for conventional roofs specifically designed for installation over wood decks or certain combustible insulation that is a glass fiber mat having a proprietary flame-retardant coating (FR-10 & FR-50 Fire Retardant Slipsheet datasheet, Atlas Roofing Corporation). The test setup and results are shown in Table 2. As shown, the inventive nonwoven fabrics showed no surface ignition and provided a better flame-resistant fabric shield than the comparison material.

TABLE 2

| Item | Deck Type | Deck Sheathing | System | Result |
|---|---|---|---|---|
| 3 | Class "A" Spread of Flame | 15/32" AC plywood | 4" DuPont XPS foam & 1 ply of 275 gsm nonwoven | Pass with no surface ignition |
| 5 | Class "A" Spread of Flame | 15/32" AC plywood | 4" DuPont XPS foam & 1 ply of 275 gsm nonwoven | Pass with no surface ignition |
| A | Class "A" Spread of Flame | 15/32" AC plywood | 4" DuPont XPS foam & 1 ply of Atlas FR-10 | Pass, but with flame spread of 26 inches |
| B | Class "A" Spread of Flame | 15/32" AC plywood | 4" DuPont XPS foam & 1 ply of Atlas FR-10 | Pass, but with flame spread of 27 inches |

Example 3

The nonwoven fabric Item 5 of Table 1, which was a mixture of 60 weight percent repurposed MPD-I fibers having various cut length (0.4 to 2.5 inches) and 40 weight percent precise cut (3 inch) MPD-I crimped virgin fibers, was further tested to determine additional fabric properties, which are summarized in Table 3.

TABLE 3

| Property | Units | Value |
|---|---|---|
| Air Resistance | Gurley seconds | 0 |
| Water Vapor Permeability (ASTM E96) | US Perm-inch | 17 +/− 0.82 |
| Water Vapor Permeance (ASTM E96) | US Perm | 111.4 +/− 3.11 |
| Trapezoid tear strength (ASTM D4533) | psi | 2380 +/− 550 |
| Tensile strength (ASTM D882) | psi | 170 +/− 13 |
| Tensile strain (ASTM D882) | % | 92 +/− 3 |

The invention claimed is:

1. An inverted roof membrane assembly comprising:
   a) a waterproofing membrane suitable for direct or indirect mounting on top of a roof decking,
   b) at least one layer of the polymer foam insulation board directly or indirectly on top of a),
   c) a flame-resistant fabric shield directly or indirectly on top of b), said flame-resistant fabric shield having a water vapor permeability of 1.0 perm or greater; and
   d) a ballast layer directly or indirectly on top of c);
   wherein the flame-resistant fabric shield comprises a nonwoven felt of staple fibers, wherein the nonwoven felt is a needle punched felt,
   the felt having:
      a water vapor permeability of 1.0 perm or greater,
      a basis weight of about 150 to 800 grams per square meter, and
      a thickness of about 1.5 to 6.0 mm;
   wherein:
      i) 20 to 100 weight percent of the total amount of staple fibers are re-purposed meta-aramid staple fibers; and
      ii) 0 to 80 weight percent of the total amount of staple fibers are crimped virgin meta-aramid staple fibers having a uniform cut length.

2. The inverted roof membrane assembly of claim 1 wherein the felt has a basis weight of about 150 to 400 grams per square meter and a thickness of about 1.5 to 4.0 mm.

3. The inverted roof membrane assembly of claim 1 wherein the felt further comprises up to 80 weight percent staple fiber having a limiting oxygen index of 24 or higher.

4. The inverted roof membrane assembly of claim 1, wherein at least 40 weight percent of the total amount of the staple fibers of the flame-resistant fabric shield are crimped staple fibers.

5. The inverted roof membrane assembly of claim 1 wherein the flame-resistant fabric shield comprises:

i) 40 to 80 weight percent re-purposed meta-aramid staple fibers; and ii) 20 to 60 weight percent crimped virgin meta-aramid staple fibers having a uniform cut length.

6. The inverted roof membrane assembly of claim 1, wherein the polymer foam insulation board has a foam density of at most 56 kg/m$^3$ (3.5 pounds per cubic foot), a thickness of at least 0.6 cm (0.25 inches), an RSI-value of at least 0.53 K·m$^2$/W per 25.4 mm of thickness (R-value of 3.0 F°·ft$^2$, h/BTU/inch of thickness).

7. The inverted roof membrane assembly of claim 6, wherein the foamed polymer foam insulation board has a foam density of 21 to 56 kg/m$^3$ and a thickness of 7.62 to 15.24 cm.

8. The inverted roof membrane assembly of claim 1, wherein b) comprises at least two layers of the polymer foam insulation board directly or indirectly on top of layer a).

9. The inverted roof membrane assembly of claim 1 wherein the ballast comprises gravel, stone, soil, one or more pavers, a green roof structure or component thereof, or a blue roof structure or component thereof.

10. A flame-resistant fabric shield comprising a nonwoven felt of staple fibers, the nonwoven felt having a water vapor permeability of 1.0 perm or greater, a basis weight of about 150 to 800 grams per square meter, and a thickness of about 1.5 to 6.0 mm;

wherein:

i) 20 to 100 weight percent of the staple fibers are re-purposed meta-aramid staple fibers; and ii) 0 to 80 weight percent of the staple fibers are crimped virgin meta-aramid staple fibers having a uniform cut length.

11. The flame-resistant fabric shield of claim 10 wherein the felt has a basis weight of about 150 to 400 grams per square meter and a thickness of about 1.5 to 4.0 mm.

12. The flame-resistant fabric shield of claim 10, wherein the nonwoven felt is a needle punched felt.

13. The flame-resistant fabric shield of claim 10 wherein the felt further comprises up to 80 weight percent staple fiber having a limiting oxygen index of 24 or higher.

14. The flame-resistant fabric shield of claim 10, wherein at least 40 weight percent of the staple fibers of the flame-resistant fabric shield are crimped staple fibers.

15. The flame-resistant fabric shield of claim 10, wherein i) 40 to 80 weight percent of the staple fibers are re-purposed meta-aramid staple fibers; and ii) 20 to 60 weight percent of the staple fibers are crimped virgin meta-aramid staple fibers having a uniform cut length.

* * * * *